May 13, 1952  J. D. CLAGUE ET AL  2,596,653
DISH FLUSHING AND WASHING DEVICE
Filed Jan. 20, 1945  2 SHEETS—SHEET 2

INVENTOR.
James D. Clague.
Mortimer R. Anslice Sr.
BY

Patented May 13, 1952

2,596,653

UNITED STATES PATENT OFFICE 2,596,653

DISH FLUSHING AND WASHING DEVICE

James D. Clague, Livonia, and Mortimer R. Anstice, Sr., Rochester, N. Y., assignors, by mesne assignments, to Toledo Scale Company, Toledo, Ohio, a corporation of New Jersey Application January 20, 1945, Serial No. 573,747

1 Claim. (Cl. 134—199)

Our invention relates to a washing machine and more particularly to a machine for prewashing, washing or flushing eating trays or dishes such as plates, saucers and cups, glasses, table silver and other eating or drinking utensils so as to remove unconsumed food and other refuse material therefrom.

While the machine of our invention may be used as a dish washing machine, it has more particularly been designed to remove unconsumed food from eating utensils prior to their being washed in a conventional dish washing machine of the type normally employed in hotels, restaurants, hospitals and other institutions where large numbers of meals are served.

The present practice in eating places where large numbers of persons are served is to wash the dishes in a conventional dish washer. Because the dishes are returned to the dish washing section or department more or less covered with unconsumed food, bits of paper, burnt matches and cigarette butts and ashes, it is the usual practice to scrape the dishes as thoroughly as possible before racking them and placing the racks in the dish washer. This hand scraping, when performed with reasonable thoroughness, is time consuming and even though quite thoroughly done does not remove all the unconsumed food. The food particles and other refuse material still remaining on the utensils after scraping, mix with the wash water in the dish washer tank which soon becomes substantially saturated with food particles in solution and suspension. Under such washing fluid conditions, clean dishes can not be obtained.

After only a short period of use, the wash water has become so filthy that the tank has to be drained, cleaned and a fresh supply of hot water and new detergent added. Not only is the hot water and detergent expensive, adding unnecessarily to the cost of washing dishes, but also during a change in the wash water the dish washer is inoperative and lost time results. Moreover, cold or tepid water cleans glasses which have been used for milk or milk-mixes more readily than hot water. Unless, in particular, glasses which have been used for milk are first washed in cold or tepid water, the hot washing fluid of the dish washer is likely to leave streaks or a cloudy film on the glasses.

An object of our invention is to provide a machine capable of removing unconsumed food and other refuse material from plates, saucers, glasses, cups and other eating and drinking utensils prior to placing such utensils in a conventional dish washer.

Another object of our invention is to provide an inexpensive and reliable machine capable of eliminating the conventional scraping of dishes now usually employed in restaurants, hotels and other large eating places, prior to washing the dishes in a dish washing machine.

A further object of our invention is to provide a machine adapted to eliminate the hand scraping of dishes wherein a vat containing the dish flushing liquid has liquid directing elements to which liquid is pumped under pressure for flushing the dishes, the vat further being provided with a screen below the liquid directing elements for separating the garbage from the flushing fluid and a clean out door, in cooperative relation with the screen, whereby refuse material may be conveniently scraped off the screen into a garbage pail or other receptacle.

Another object of our invention is to provide a machine usable as a pre-washer, regardless of whether hand or machine washing is thereafter used, and usable domestically as a dish washer.

Our invention further contemplates a machine having fluid directing elements which are adapted, under pressure, to impinge a preferably fan shaped substantially solid stream of liquid on the opposite sides of a tray, dish or other article of tableware held in a dish flushing or washing space between the fluid directing elements to the end that unconsumed food and other refuse materials are removed prior to washing the dishes in a conventional dish washer.

Other objects and advantages of our invention will be set forth in the claim and will be apparent from the following description, when taken in connection with the drawings, in which:

Figure 1:
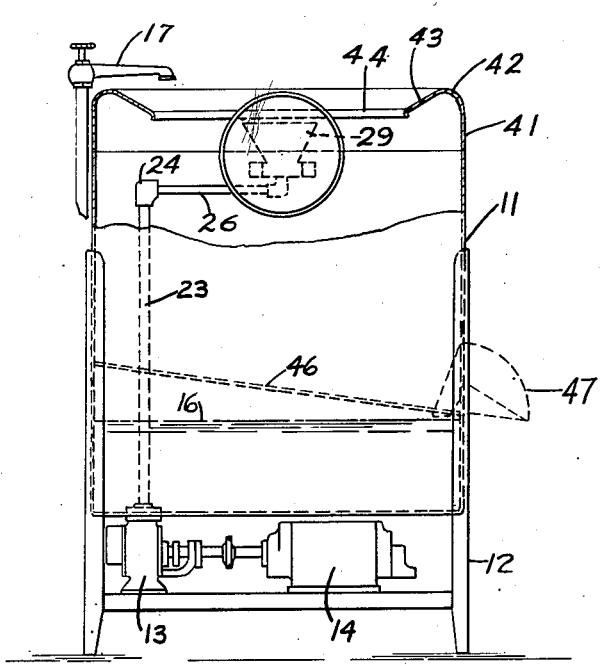
Fig. 1 is a vertical view, partly in section, of the machine of our invention.

The machine of our invention comprises a tank or vat 11 (Fig. 1) mounted on suitable supporting legs 12, a pressure pump 13, preferably of the centrifugal type, and an electric motor 14 for driving the pump which may be connected thereto in driving relation in any suitable manner. The pump and motor may be mounted on a suitable platform supported by the legs and may be enclosed if desired. It is, of course, contemplated that a pump perhaps of the submerged type may be mounted within the vat.

Figure 2:
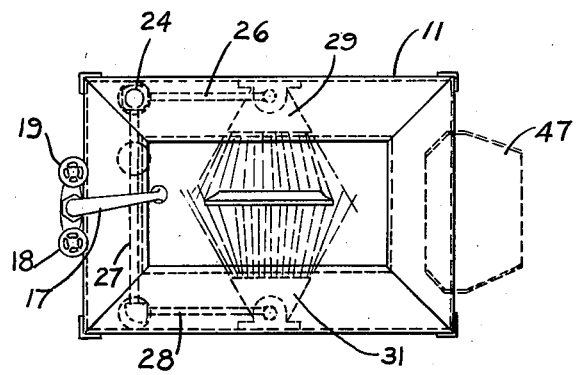
Fig. 2 is a top plan view thereof.

The vat 11 serves as a reservoir for flushing or washing liquid and should be filled therewith to a level approximately indicated at 16. Water may be supplied to the vat from an external source through a preferably swiveled spout 17 (Fig. 2) connected to a valved hot water connection, indicated at 18, and a valved cold water connection, indicated at 19. An overflow pipe 21 connected to a suitable drain, determines the normal liquid level in the vat.

The liquid is drawn from the reservoir into the suction of the pressure pump through an opening in the bottom of the vat and through a relatively fine mesh screen 22 which serves to keep particles of food and refuse material out of the pump suction or intake. The pump is adapted to develop a relatively high pressure so that the dishes will be flushed with a stream of liquid (as will be presently described) at a pressure not only sufficient to wash or flush food particles from the dishes which are loose and wash off easily but also those which adhere thereto, such as egg yolk, grease and numerous foods which tend to solidify on the dishes.

The liquid is discharged from the pump through an opening in the bottom of the vat and into a pipe 23 which extends upward along the inner side wall of the vat. Near the upper end of the vat a fitting 24 is provided to which are connected pipes 26 and 27. A pipe 28 is connected to the pipe 27 by an elbow and extends along the opposite side of the vat. The pipes connect the pump to liquid directing elements 29 and 31 located on opposite sides of the vat. Since the liquid directing elements are preferably identical, a description of one will suffice.

Figure 4:
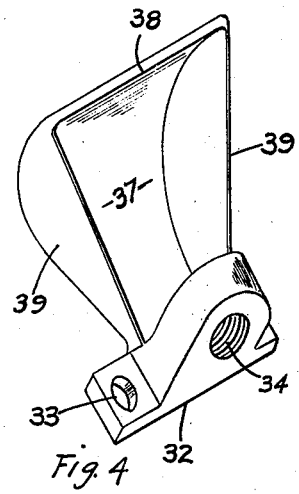
Fig. 4 is a perspective view of one of the nozzles or liquid directing elements of our invention.
Figure 5:
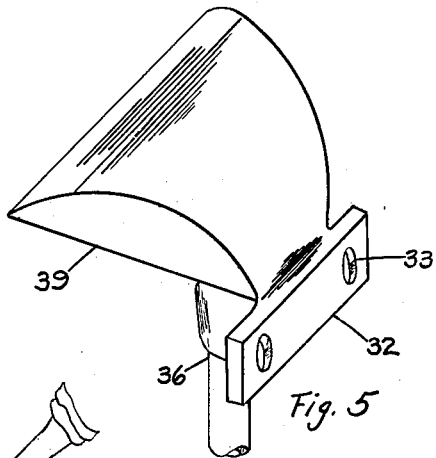
Fig. 5 is another perspective view of one of the liquid directing elements.

As shown most clearly in Figures 4 and 5, each of the liquid directing elements preferably includes a bracket 32 provided with suitable bores 33 for the reception of bolts for attaching the element to the side wall of the vat. A threaded opening 34 extends through the bracket for the reception of the end of the piping from the pump, as shown at 36. If desired, of course, the liquid directing elements may be supported by the pipes or held in position in any other desired manner.

Each of the liquid directing elements comprises a curved canopy like top 37 of inverted trough shaped cross-section, the top preferably being curved approximately on the arc of a circle and having side edge portions, one of said side edge portions being in alignment with the outer side of a supply nipple or short pipe 36. The other side portion is so oriented as to provide a discharge lip for directing the liquid downwardly at an angle to the vertical.

Of considerable importance is the fact that the liquid, under pressure, discharges from the end of the pipe at high velocity and impinges against the facing curved wall 37. The impact of the liquid at high velocity striking the wall tends to spread the liquid in a relatively uniform layer over the surface of this wall. For the purpose of confining and directing the liquid, the element is provided with end walls 39 which diverge toward the discharge lip. The effect of the diverging side walls, while confining the liquid, is to cause the stream to issue from beneath the discharge lip in a fan shaped stream as appears more clearly in Fig. 2. The divergence of the end walls is made sufficient so that the stream preferably encompasses the largest diameter of dish or other utensil desired to be flushed or washed.

As previously mentioned, the liquid tends to spread over the surface 37 (Figs. 3 and 4) in a layer of substantially uniform thickness. Thus the liquid is caused to issue from beneath the discharge lip 38 in a diverging substantially solid stream of liquid, a cross section of which would be approximate a rectangle almost filled with liquid. That is, the liquid is supplied in such quantity and at such pressure that, together with the spreading effect above described, the liquid is caused to impinge on the plate or other article being washed in a substantially solid fan shaped stream as distinguished from a spray which appears from our observations to be less effective for the purposes desired.

Figure 3:
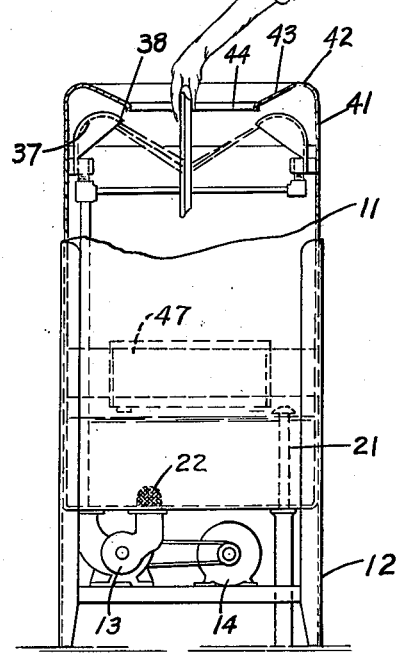
Fig. 3 is a side vertical view of the machine of our invention, partly in section, showing a plate in position to be flushed clean of food particles.

In Figure 3 we have shown a plate held in position for flushing or washing, the plate being moved upward and downward from the position shown to flush refuse material from the entire surface of the plate. It will be noted that when held in this position, the streams strike the plate at an acute angle to the opposite surfaces of the plate. We have found that when the streams are directed at an acute angle, they are more effective to loosen and dislodge food particles and other refuse material.

When material particularly difficult to dislodge adheres to the plate, we have found it desirable to pass the plate or other utensil several times upward and downward through the stream so that the materials are first soaked, then loosened, due partly to the angularity of the stream, and then flushed off. The effectiveness of the angularity of the stream may be in some measure demonstrated by the fact that when a plate is held in the position shown there is a strong downward pull on the plate. This downward force acts upon the unconsumed food lodged on the surface of the plate, loosens it and flushes or washes it off the surface.

It will be particularly noted that the streams from opposite liquid directing elements intersect each other centrally of the utensil flushing space between them. Thus the forces are balanced on opposite sides of the plate and there are no twisting forces on the plate. However, the pressure on food particles difficult to dislodge may be increased by firmly holding the plate and moving the side of the plate or other article upon which the material adheres closer to the discharge lip of the liquid directing element. At this point the pressure of the stream is greatest.

It will be noted that the pre-washer of our invention washes or flushes both sides of the dish simultaneously. This is important in saving time as the under sides of dishes are likely to be soiled due to stacking of the dishes. Moreover, this arrangement makes it unnecessary for the operator to turn the dish over and he may hold either side of the dish facing either of the liquid directing elements.

The upper end of the vat (Fig. 3) may be provided with a cover 41 which, if desired, may be hinged to the vat. The upper wall of the cover is turned inward at 42 and downward, as shown at 43, on all sides which, combined with the fact that the streams are directed in a downward direction, is effective to prevent the escape of liquid from the top opening in the vat. The downwardly turned surfaces of the cover terminate in a bead 44 which defines the opening into the vat, which opening is in registry with the utensil flushing space between the liquid directing elements.

A screen 46 (Fig. 1) is located between the utensil flushing space and the normal surface level of the liquid in the vat to catch the particles of food and other refuse material. The screen can be placed at an angle to the horizontal, slanting downward toward a clean out door, generally indicated by the numeral 47. The garbage is separated from the circulating flushing liquid by being caught by the screen. When sufficient garbage has collected on this screen to interfere with the free flow of liquid into the tank, the pump is stopped, the door opened and the collected garbage scraped into a garbage can, pail or other suitable receptacle, all of which can be accomplished in a very short period of time. It has been found that tableware after being pressure flushed in this machine and then put into an ordinary commercial dish washer, is so free of food particles that the washing fluid in the dish washer, with its detergent, can be used without changing for five to ten times as long as when dishes are hand scraped in the usual manner.

As previously mentioned the flushing or washing of the utensils or tableware is accomplished by the pressure and volume of liquid impinging upon the opposite surfaces of the articles. Thus cold or tepid water, with or without detergent, is sufficient to accomplish the purposes of our invention. However, we have found that in addition to its employment as a pre-washer for use in connection with a conventional dish washer, the machine is an effective dish washer. If the machine is used as a dish washer the dishes should preferably be scraped prior to flushing or washing, and detergent and hot water should, of course, be used.

While we have shown and described the prefered form of our invention, it will be appreciated that various changes and modifications may be made therein, particularly in the form and relation of parts, without departing from the spirit of our invention as set forth in the appended claim.

We claim:

In a machine for prewashing dishes and the like, the machine comprising an open topped tank equipped with means for circulating liquid for dislodging waste material from dishes and for straining the waste material from the circulating liquid, in combination, an inwardly and downwardly directed rim that partially closes the top of the tank and that defines an opening into the tank, a pair of liquid directing elements disposed immediately subjacent the rim and on opposite sides of the opening defined by the rim, each of said elements having a curved canopy like top of inverted trough shaped cross-section, said canopy like top having side edge portions at the opposite extremities of the curve of the canopy like top, one of said side edge portions being in alignment with the outer side of a supply pipe and the other side edge portion being directed downwardly at an angle to the vertical and across the space beneath the opening in the rim, each of the elements having walls extending vertically downwardly at opposite ends of the curved canopy like top and diverging from the side edge portion of said top that is adjacent to the supply pipe for limiting the lateral spread of the stream of liquid issuing from the supply pipe and directed by said element, said directing elements being oriented so that the liquid streams intersect in the center of the space beneath the opening and below the level of the directing elements, whereby articles inserted through the opening and into the intersecting streams are subjected to vigorous flushing action without being urged laterally.

JAMES D. CLAGUE.
MORTIMER R. ANSTICE, Sr.

REFERENCES CITED

The following references are of record in the file of this patent:

UNITED STATES PATENTS

| Number | Name | Date |
| --- | --- | --- |
| 485,690 | Harding | Nov. 8, 1892 |
| 908,509 | Silverglade | Jan. 5, 1909 |
| 927,905 | Walter | July 13, 1909 |
| 1,495,473 | Fitzgerald | May 27, 1924 |
| 1,521,390 | Reynolds | Dec. 30, 1924 |
| 1,678,252 | Kendall | July 24, 1928 |
| 1,691,839 | Caskin | Nov. 13, 1928 |
| 1,961,548 | Caise | June 5, 1934 |
| 2,065,549 | Balensiefer | Dec. 29, 1936 |
| 2,189,176 | Kendall | Feb. 6, 1940 |
| 2,191,799 | McKenna | Feb. 27, 1940 |
| 2,229,663 | Meeker et al. | Jan. 28, 1941 |
| 2,254,824 | Large | Sept. 2, 1941 |
| 2,275,189 | Wieghart | Mar. 3, 1943 |
| 2,370,609 | Wilson et al. | Feb. 27, 1945 |
| 2,392,540 | Lyman | Jan. 8, 1946 |

FOREIGN PATENTS

| Number | Country | Date |
| --- | --- | --- |
| 168,351 | Great Britain | Sept. 8, 1921 |
| 309,878 | Great Britain | Apr. 25, 1929 |